United States Patent [19]

Sasaki

[11] Patent Number: 5,778,085
[45] Date of Patent: Jul. 7, 1998

[54] AUDIO CONFERENCE DEVICE HAVING ECHO CANCELLER

[75] Inventor: Kiyoshi Sasaki, Tokyo, Japan

[73] Assignee: NEC Corporation, Tokyo, Japan

[21] Appl. No.: 636,867

[22] Filed: Apr. 23, 1996

[30] Foreign Application Priority Data

Apr. 27, 1995 [JP] Japan ................................. 7-103736

[51] Int. Cl.$^6$ ..................................... H04R 25/00
[52] U.S. Cl. ........................ 381/169; 381/168; 381/205; 379/202
[58] Field of Search ........................... 381/168, 169, 381/91, 188, 122, 155, 170, 205; 379/202, 420, 428, 433

[56] References Cited

U.S. PATENT DOCUMENTS 1,235,510  7/1917  Tigerstedt ............................. 381/157
3,947,646  3/1976  Saito .................................... 381/169
5,282,245  1/1994  Anderson ............................. 381/169

FOREIGN PATENT DOCUMENTS 0010900  1/1985  Japan ................................... 381/170
2220546  1/1990  United Kingdom ................. 379/202

*Primary Examiner*—Huyen Le
*Attorney, Agent, or Firm*—Scully, Scott, Murphy and Presser

[57] ABSTRACT

In an audio conference device for housing an acoustic echo canceller function, a speaker and a microphone in a portable frame, a microphone 5 is provided in a tubular elastic member 4 whose tip end has been protruded in the shape of a funnel. This elastic member 4 is mounted so that its funnel-shaped tip end protrudes outwardly from the frame. With this structure, it is possible to prevent the speech sound, which propagates inside the frame from the speaker from being collected by the microphone, thus making it possible to reduce the degree of acoustic combination between the microphone and the speaker.

6 Claims, 1 Drawing Sheet

AUDIO CONFERENCE DEVICE HAVING ECHO CANCELLER

BACKGROUND OF THE INVENTION

The present invention relates to an audio conference device having an echo canceller and, more particularly to an audio conference device in which acoustic combination of a speaker and a microphone, which are used for the audio conference device, has been made small.

Tele-conference has recently been attracting public attention in order to increase the efficiency of a conference. Since, however, the device for tele-conference is still expensive, an audio conference device for holding a conference only by speech sound is extensively used as a substitute for the teleconference device, because the audio conference device is simple and low-cost.

Such an audio conference device generally uses an echo canceller in order to prevent howling or echo produced when an audio signal from a speaker goes round to a microphone. However, the speech sound from the speaker in the frame propagates into the microphone, and therefore, the echo canceller described above will not effectively function if the speech sound is not completely shut out. In addition to the use of such an echo canceller, therefore, an attempt has heretofore been made to completely enclose the microphone by placing it into a case separate from the frame.

In the conventional enclosed structure, however, a microphone and a speaker are present in the same frame, and the microphone surely requires an opening on inputting, and therefore, it is impossible to completely prevent an audio signal from going round. Also, a testing method to prepare another case for completely enclosing, and to obtain desired characteristics while carefully assembling and adjusting will increase the expenses. Further, even if good characteristics are obtained at the initial stage, change in the external environment, and the like may cause distortion to the frame, and change the characteristics.

SUMMARY OF THE INVENTION

It is an object of the present invention to solve the above-described conventional problems, and to provide an audio conference device which prevents the speech sound from the speaker for propagating inside the frame from entering the microphone.

An aspect of the present invention has a microphone housed in a tubular elastic member, whose tip end has been protruded in the shape of a funnel. The elastic member is mounted with this funnel-shaped tip end protruded outwardly from the frame.

According to the present invention, since the tip end of the elastic member for housing the microphone is protruded outwardly from the device, only the speech sound from the outside of the device, which is the object, can be collected without collecting, by the microphone, the speech sound which propagates inside the frame from the incorporated speaker.

BRIEF DESCRIPTION OF THE DRAWINGS

The above and other objects, features and advantages of the present invention will become apparent from the following detailed description when taken with the accompanying drawings, in which.

DETAILED DESCRIPTION OF PREFERRED EMBODIMENT

Figure 1:
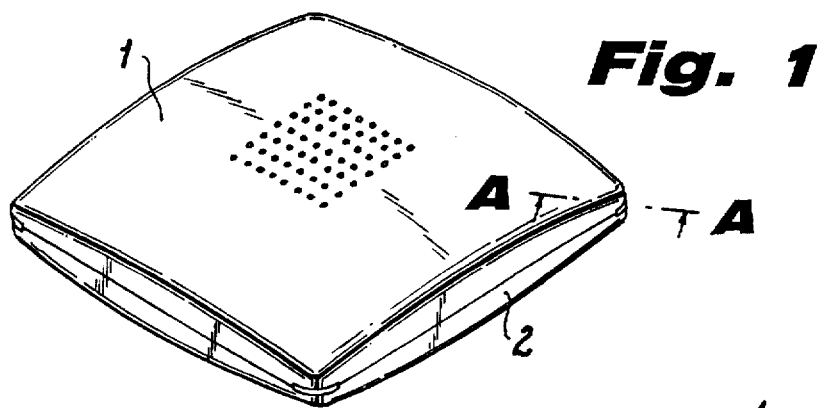
FIG. 1 is an external perspective view of a device showing an embodiment according to the present invention.
Figure 2:
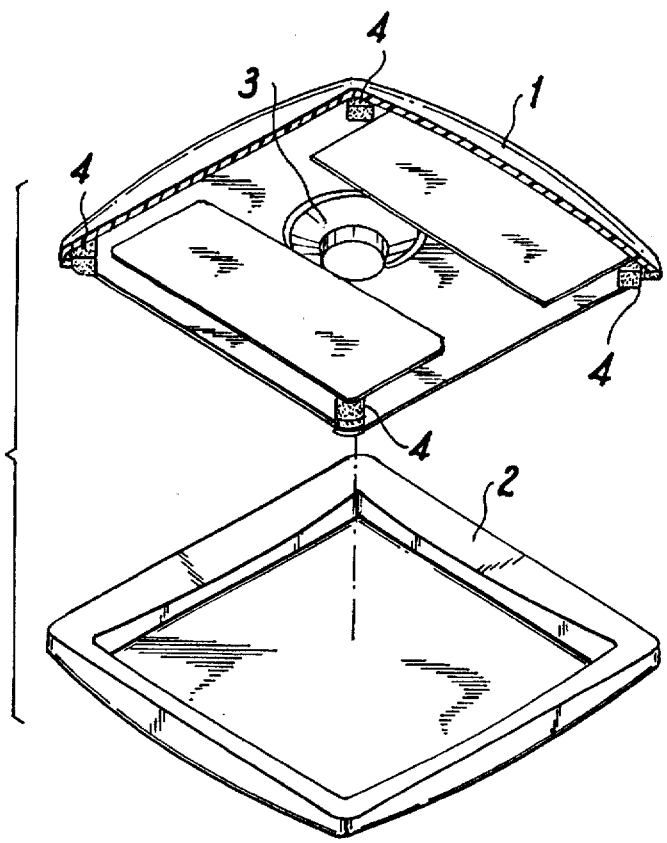
FIG. 2 is an exploded perspective view of FIG. 1.
Figure 3:
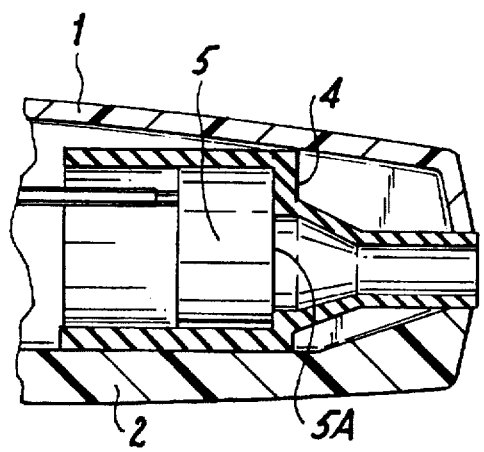
FIG. 3 is a sectional view taken on line A—A of FIG. 1.

Hereinafter, with reference to the accompanying drawings, the detailed description will be made of an embodiment according to the present invention. FIG. 1 is an external perspective view of a device showing an embodiment according to the present invention; FIG. 2 is an exploded perspective view of FIG. 1; and FIG. 3 is a sectional view taken on line A—A of FIG. 1. In this respect, an electric circuit such as an echo canceller is omitted for simplification of the description in these drawings.

In FIGS. 1 and 2, the frame of the conference device is composed of a cover 1 and a base 2. At the center of the cover 1, there is arranged a speaker 3. Also, at four corners of the cover 1, there are provided elastic members 4 each housing a microphone therein.

FIG. 3 shows the elastic member 4 housing a microphone in details. This tubular elastic member 4 is made of, for example, rubber, and its tip end is tapered in the shape of a funnel. A microphone 5 is inserted so that the sound collecting portion 5A comes into contact with the funnel-shaped side of the elastic member. The funnel-shaped tip end portion of the elastic member 4 is restrained by a cover 1 and a base 2 to protrude outwardly from the device. To this end, the speech sound, which propagates inside the frame from the incorporated speaker 3, is not collected by the microphone, but only the speech sound from the outside of the device, which is the object, can be collected. In this respect, instead of protruding the funnel-shaped tip end portion outwardly from the frame, it is also possible to arrange so that the funnel-shaped tip end portion is flush with the outer peripheral surface of the frame. Further, the elastic member may be taper-shaped or of other shapes to protrude the tip end portion of the elastic member 4 outwardly.

What is claimed is:

1. A conference device for housing an acoustic echo canceller function, a speaker and a microphone in a frame,
    said microphone being housed so that a sound collecting portion of said microphone faces a funnel-shaped side of a tubular elastic member whose tip end is protruded in a shape of a funnel; said elastic member being mounted with the funnel-shaped tip end thereof protruded outwardly from the frame; and
    acoustic combination between said speaker and said microphone being a certain level or less.

2. A conference device as defined in claim 1, wherein said elastic member is made of rubber.

3. A conference device as defined in claim 1, wherein said frame is square, and said microphones have been provided at four corners of said frame.

4. A conference device, comprising: a frame, a speaker and a microphone which have been provided in said frame; and anti-audio going-round means having a funnel shaped end and a tip end; said anti-audio going-round-means holding said microphone inside and preventing a speech sound from said speaker from going round to said microphone; wherein said tip end protrudes outwardly from said frame and the funnel shaped end faces the microphone.

5. An arrangement of microphones for use in a conference device having a speaker, comprising a frame for housing said microphones and said speaker, and anti-audio going-round means having funnel shaped end and a tip end; said anti-audio going-round means holding one of said microphones inside and preventing a speech sound from said speaker from going round to said one microphone; wherein said tip end is flush with an outer peripheral surface of said frame and the funnel shaped end faces said microphone.

6. A conference device, comprising: a frame, a speaker and a microphone which have been provided in said frame; and anti-audio going-round means having a funnel shaped end and a tip end; said anti-audio going-round means holding said microphone inside and preventing a speech sound from said speaker from going round to said microphone; wherein said tip end is flush with an outer peripheral surface of said frame and the funnel shaped end faces the microphone.

* * * * *